July 28, 1925. 1,547,822
A. REICHLING
BICYCLE SLEDGE
Filed April 29, 1924
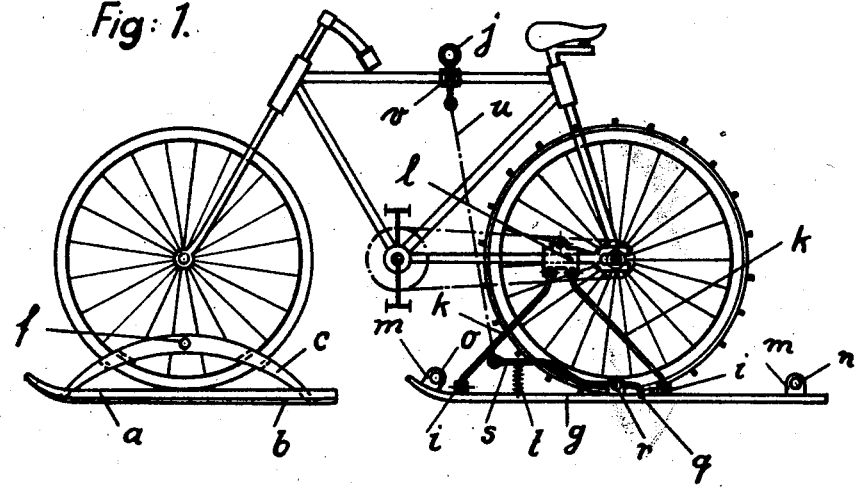
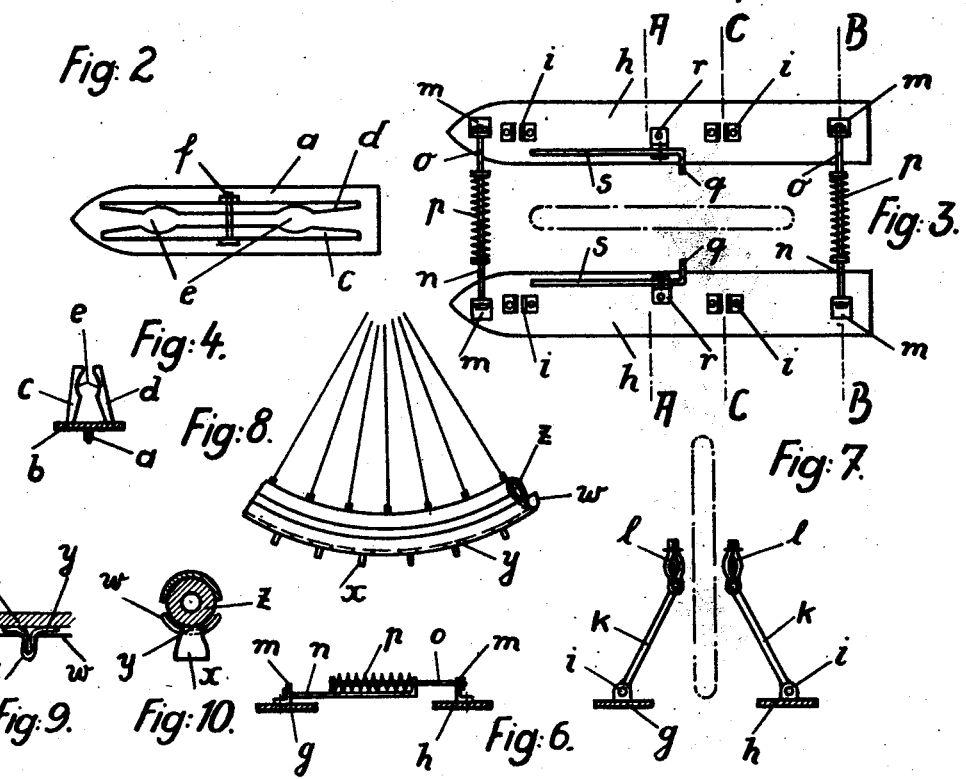
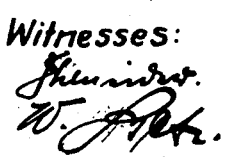
Witnesses:
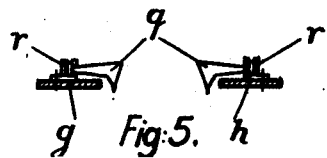
Inventor:
Alois Reichling Patented July 28, 1925.

1,547,822

UNITED STATES PATENT OFFICE.

ALOIS REICHLING, OF KAADEN-ON-THE-EGER, CZECHOSLOVAKIA.

BICYCLE SLEDGE.

Application filed April 29, 1924. Serial No. 709,877.

*To all whom it may concern:*

Be it known that I, ALOIS REICHLING, a citizen of Czechoslovakia, and residing at Kaaden-on-the-Eger, Czechoslovakia, have invented certain new and useful Improvements in Bicycle Sledges, of which the following is a specification.

This invention relates to a bicycle sledge, and more particularly to an improved arrangement for easily and quickly changing, at snowy weather, a bicycle, or a motor bicycle, to a sledge.

The improvement is illustrated on the accompanying drawing, in which: Fig. 1 is a side view of a bicycle with the sledge arrangement thereon, the other figures showing details of the latter, namely Fig. 2 a plan view of the front runner, Fig. 3 a plan view of the two rear runners, Fig. 4 a front view of the front runner, Fig. 5 a sectional rear view on the line A—A of Fig. 3 of the rear runners with auxiliary brakes thereon, Fig. 6 another sectional rear view on the line B—B of Fig. 3 of the rear runners with their connection by spring rods, Fig. 7 another sectional rear view on the line C—C of Fig. 3 of the rear runners with their connection to the rear bicycle frame, Fig. 8 a fragmentary side view of the rear bicycle wheel with a gripping tire thereon, Figs. 9 and 10 respectively a sectional side view of part of, and a cross section through, said gripping tire.

The front runner $a$ has a lower projecting blade $b$ to facilitate its steering and two parallel upper bows $c$ and $d$ with recesses $e$ formed therein for the reception of the front wheel of the bicycle, which is placed therein after the two bows are somewhat spread asunder, a screw $f$ passed through the latter serving to hold the bicycle wheel fast between the two bows.

For the rear driving wheel of the bicycle two parallelly arranged runners $g$, $h$ are provided, which secure the bicycle against lateral tilting. Said runners have front and rear bearings $m$ for the reception of two pairs of rods $n$, $o$, each pair embracing one another and holding a pressure spring $p$ between them. Lugs $i$ at the front end and in about the middle of the rear runners serve for the reception of links $k$, which are attached to clips $l$ adapted to be fastened to both sides of the rear bicycle frame.

The rear wheel of the bicycle receives a gripping tire which is mounted thereon with empty rubber tire $z$ and immovably held in place after the rubber tire has been pumped up. Said gripping tire comprises an endless belt $w$ and a plurality of grippers having each a foot member $y$ attached to the inside of said belt and a radial outwardly projecting gripping member $x$ on said foot member. Said gripping tire serves to engage into the snowy ground under the weight of the cyclist riding on the saddle of the bicycle and to propel the bicycle sledge when the pedals are operated. If the rear wheel is, however, unloaded, the same is somewhat lifted by action of the springs $p$ which then draw the rear runners toward one another and slightly turn the links $k$ in their lugs. Thus, the bicycle when unloaded can be easily advanced by hand without the rear wheel engaging in the snowy ground.

For running downhill the cyclist, without ascending the saddle of the bicycle, can tread upon the two rear runners.

An auxiliary brake $s$, $q$ can be mounted on each rear runner and held in its inoperative position by means of a pull spring $t$, a pull cord $u$ attached to said brake and leading to a handle $j$ within a clip $v$ on the upper bicycle frame serving to apply said brakes if desired.

The whole sledge arrangement is easily and quickly detachable from the bicycle, and its accessories can be put together in a parcel and, being of light weight, easily carried along with the bicycle and attached to the latter in case of need.

What I claim, is:—

1. In a bicycle sledge: the combination with an ordinary bicycle, a front runner attached to the front bicycle wheel, two parallel rear runners yieldingly attached to the rear bicycle frame, and a gripping tire on the rear bicycle wheel adapted to engage the ground with loaded bicycle; of an auxiliary brake on each of said two rear runners, substantially as set forth.

2. A bicycle sledge as specified in claim 1, in which said gripping tire comprises an endless belt and a plurality of grippers thereon, each gripper consisting of a foot member attached to the inside of the belt and a radial outwardly projecting gripping member on said foot member, substantially as set forth.

3. A bicycle sledge as specified in claim 1, in which said front runner comprises two parallel bows having recesses therein for the reception of the front bicycle wheel between them, and a screw for holding said bows in position, substantially as set forth.

In testimony whereof I have hereunto set my hand in the presence of two subscribing witnesses.

ALOIS REICHLING.

Witnesses:
 Dr. ED HORGL,
 M. WEISFRANZ, Fr.